Patented Aug. 29, 1950

2,520,214

UNITED STATES PATENT OFFICE 2,520,214

PROCESS FOR TREATING LEGUMES TO ENHANCE COLORATION PREPARATORY TO FREEZING

James Ralph Kenworthy, Jr., Modesto, Calif., assignor to John Inglis Frozen Foods Co., Stockton, Calif., a corporation of California No Drawing. Application February 14, 1949, Serial No. 76,427

2 Claims. (Cl. 99—193)

The present invention is directed to, and it is an object to provide, a novel process for treating legumes, prior to commercial quick-freezing, for the purpose of intensifying and preserving their color.

It is very desirable to retain the initial full green color of legumes, such as Lima beans, which are commonly preserved as a quick-frozen food. To date, however, this has been a problem, for the reason that the color of such legumes is due primarily to the chlorophyll therein, which tends to fade because of enzymatic action upon the legumes being removed from the pod. In spite of rapid handling and blanching for enzyme inactivation, legumes—including particularly Lima beans—tend to develop a commercially undesirable grey-green color after freezing, even though the food value remains unaltered.

It is therefore a major object of this invention to provide a process for treating legumes, preparatory to freezing, which overcomes the above problem, and makes possible the production of frozen legumes which possess a fresh, bright, pleasing, green color.

Another object of this invention is to provide a process, as above, wherein the enhanced color of the legumes persists through freezing, thawing, and cooking thereof.

A further object of the invention is to provide a process, for the purpose described, which includes the steps of subjecting the legumes to a bath of dilute alkaline solution so as to adjust their pH value upward to a limited extent, and then flushing or rinsing the legumes with fresh water to arrest such action.

It is also an object of the invention to provide a process which is relatively simple and economical in practice.

Still another object of the invention is to provide a practical and reliable process for enhancing the color of legumes, and a process which will be exceedingly effective for the intended purpose.

These objects are accomplished by means of such process steps as will fully appear by a perusal of the following specification and claims.

The process is hereinafter described as employed in connection with the preparation of Lima beans as a commercially quick-frozen food; it being understood, however, that the process is adaptable to other legumes.

For the treatment of Lima beans, such, for example, as the thin-seeded Henderson bush variety, or the thick-seeded Fordhook variety, the process comprises the immersion of the beans, after depodding and initial grading and washing, in a dilute alkaline solution for a limited period of time, and thereafter immediately removing the beans and subjecting the same to a thorough flushing or rinsing in fresh water to arrest the action of the alkaline solution.

It is necessary to control the concentration and temperature of the alkaline bath, and to predetermine the time of immersion of the beans therein, in order that the reaction does not proceed beyond the desired point. The process contemplates the adjustment of the pH of the beans upwards by 0.1 to 0.2 from that normally encountered.

The presently preferred steps comprise immersion of the beans for approximately one minute in a solution of 1% sodium hydroxide; the temperature of the solution being most favorable at 65°–70° F. and should be held below 85°–90° F. The clear water flush or rinse, at a relatively cool temperature, immediately follows the foregoing one-minute immersion of the beans in the solution, whereby to remove residues of the alkali and arrest further action.

The enhanced green coloration of the beans is accomplished, apparently, by a reaction which is a hydrolysis of chlorophyll to chlorophyllin or other phyllins. This is due principally to the slight alteration of the hydrogen ion concentration toward the alkaline side.

Certain different alkaline materials will produce the color enhancement of the beans, but sodium hydroxide is preferred because of its commercial availability and because it is less apt to impart objectionable tastes to the treated beans.

The color development penetrates below the skin and about ten per cent of the way into the center of the bean. The skin appears to be a little more transparent after treatment, which is in itself an aid to color.

The herein described process can be undertaken before or after the usual blanching by hot water or steam; although probably the best results are attained by blanching later, as the subsequent processing insures a more complete leaching of the alkali residue. Thus, subsequent to the coloration process, the beans are handled conventionally, to wit, blanched, packaged, and then quick-frozen.

The process does not impair the beans with respect to quality factors, such as flavor, texture, or nutrient value; there being no significant loss of protein, ascorbic acid, thiamin, or riboflavin. Additionally, skin slippage does not result.

Lima beans treated by the process which is the subject of this invention possess a vivid, even, green color pleasing to the eye and thus high in commercial acceptance. The grade of Lima beans so processed is raised, as the so-called "whites" are effectively brought to color.

Further, as the improved color persists throughout freezing, thawing, and cooking, there is a continuing advantage to the process.

From the foregoing description, it will be readily seen that there has been produced such a process as substantially fulfills the objects of the invention, as set forth herein.

While this specification sets forth the present and preferred details of the process, still in practice such deviations from such details may be resorted to as do not form a departure from the spirit of the invention, as defined by the appended claims.

Having thus described the invention, the following is claimed as new and useful, and upon which Letters Patent are desired:

1. That method of preparing fresh vegetables for freezing comprising: immersing the vegetables in an approximately one per cent solution of sodium hydroxide for approximately one minute at a temperature of the order of 65 degrees to 70 degrees Fahrenheit, removing them from the solution and immediately rinsing them in clear water of relatively cool temperature.

2. That method of preparing fresh vegetables for freezing comprising: immersing the vegetables in an approximately one per cent solution of sodium hydroxide for approximately one minute at a temperature of the order of not less than 65 degrees and not greater than 90 degrees Fahrenheit, removing them from the solution and immediately rinsing them in clear water of relatively cool temperature.

JAMES RALPH KENWORTHY, Jr.

REFERENCES CITED

The following references are of record in the file of this patent:

UNITED STATES PATENTS

| Number | Name | Date |
| --- | --- | --- |
| 2,186,003 | Blair | Jan. 9, 1940 |
| 2,189,774 | Blair | Feb. 13, 1940 |
| 2,274,874 | Steinwand | Mar. 3, 1942 |
| 2,305,643 | Stevenson | Dec. 22, 1942 |
| 2,318,426 | Schroder | May 4, 1943 |
| 2,437,859 | Moulthrop | Mar. 16, 1948 |
| 2,473,747 | Gieseker | June 21, 1949 |